US009736111B2

(12) United States Patent
Lopez Da Silva et al.

(10) Patent No.: US 9,736,111 B2
(45) Date of Patent: Aug. 15, 2017

(54) METHOD AND SYSTEM FOR THE CREATION, MODIFICATION AND REMOVAL OF A DISTRIBUTED VIRTUAL CUSTOMER HOME GATEWAY

(71) Applicant: Telefonica, S.A., Madrid (ES)

(72) Inventors: Rafael Alejandro Lopez Da Silva, Madrid (ES); Pedro Andrés Aranda Gutiérrez, Madrid (ES); Francisco Javier Ramón Salguero, Madrid (ES); Gerardo García De Blas, Madrid (ES)

(73) Assignee: Telefonica, S.A., Madrid (ES)

( * ) Notice: Subject to any disclaimer, the term of this patent is extended or adjusted under 35 U.S.C. 154(b) by 148 days.

(21) Appl. No.: 14/651,714

(22) PCT Filed: Dec. 19, 2013

(86) PCT No.: PCT/EP2013/077347
§ 371 (c)(1),
(2) Date: Jun. 12, 2015

(87) PCT Pub. No.: WO2014/096173
PCT Pub. Date: Jun. 26, 2014

(65) Prior Publication Data
US 2015/0372973 A1 Dec. 24, 2015

(30) Foreign Application Priority Data
Dec. 20, 2012 (EP) .................................. 12382518

(51) Int. Cl.
*H04L 29/12* (2006.01)
*H04L 12/28* (2006.01)
(Continued)

(52) U.S. Cl.
CPC ...... *H04L 61/2592* (2013.01); *H04L 12/2818* (2013.01); *H04L 12/2834* (2013.01);
(Continued)

(58) Field of Classification Search
None
See application file for complete search history.

(56) References Cited

U.S. PATENT DOCUMENTS

| 9,374,267 B2 * | 6/2016 | Poirier | H04L 61/2528 |
| 2002/0120761 A1 * | 8/2002 | Berg | H04L 29/06 709/230 |

(Continued)

FOREIGN PATENT DOCUMENTS

| CN | 102204121 A | 9/2011 |
| WO | 2009/061677 A1 | 5/2009 |
| WO | 2012/089504 A1 | 7/2012 |

OTHER PUBLICATIONS

A. Durand, "Dual-stack lite broadband deployments post IPv4 exhaustion draft-durand-dual-stack-lite-00", Internet Engineering Task Force, Jul. 7, 2008.
(Continued)

*Primary Examiner* — Ayaz Sheikh
*Assistant Examiner* — Faiyazkhan Ghafoerkhan
(74) *Attorney, Agent, or Firm* — Sughrue Mion, PLLC

(57) ABSTRACT

The at least one distributed virtual CPE comprising at least one IP Edge node, at least one Carrier Grade NAT node, at least one User Configuration Server and at least one Line Configuration Server, the method creating said at least one distributed virtual CPE upon the reception of traffic from a home in the access line corresponding to said home; modifying said at least one distributed virtual CPE upon a customer request; removing said at least one distributed virtual CPE, upon a traffic inactivity timeout detected in said access line or upon an administrative command; and associating a line identifier and a customer identifier to said at least one distributed virtual CPE, wherein said association, termed vCPE context, is known partially or totally by the at least one IP Edge node, the at least one Carrier Grade NAT, (Continued)

the at least one User Configuration Server and the at least one Line Configuration Server, and is kept active during the whole life cycle of said distributed virtual CPE from the creation to the removal.

16 Claims, 7 Drawing Sheets

(51) Int. Cl.
*H04L 12/46* (2006.01)
*H04L 12/64* (2006.01)
*H04L 12/66* (2006.01)

(52) U.S. Cl.
CPC ...... *H04L 12/2856* (2013.01); *H04L 12/4641* (2013.01); *H04L 12/6418* (2013.01); *H04L 12/66* (2013.01); *H04L 61/2514* (2013.01)

(56) References Cited

U.S. PATENT DOCUMENTS

| | | | |
|---|---|---|---|
| 2003/0198189 A1* | 10/2003 | Roberts | H04L 45/60 370/252 |
| 2006/0098630 A1* | 5/2006 | Berg | H04L 29/06 370/352 |
| 2007/0061417 A1* | 3/2007 | Berg | H04L 67/1008 709/217 |
| 2007/0061418 A1* | 3/2007 | Berg | H04L 67/1008 709/217 |
| 2007/0061437 A1* | 3/2007 | Berg | H04L 67/1008 709/223 |
| 2008/0279202 A1* | 11/2008 | Choi | H04L 12/2803 370/401 |
| 2009/0177772 A1* | 7/2009 | Guan | H04L 61/1582 709/224 |
| 2009/0207738 A1* | 8/2009 | Denis-Courmont | H04L 12/5695 370/238 |
| 2010/0071050 A1* | 3/2010 | Wing | H04L 63/0218 726/11 |
| 2010/0165993 A1* | 7/2010 | Basilier | H04L 12/2809 370/395.53 |
| 2010/0202450 A1* | 8/2010 | Ansari | G06Q 30/04 370/389 |
| 2010/0205301 A1* | 8/2010 | Ansari | G06Q 30/04 709/225 |
| 2010/0217837 A1* | 8/2010 | Ansari | G06Q 30/04 709/218 |
| 2010/0235433 A1* | 9/2010 | Ansari | G06Q 30/04 709/203 |
| 2010/0267408 A1* | 10/2010 | Lee | H04W 52/243 455/509 |
| 2011/0219443 A1* | 9/2011 | Hampel | H04L 63/029 726/11 |
| 2012/0014333 A1* | 1/2012 | Ji | H04L 5/0032 370/329 |
| 2012/0155319 A1* | 6/2012 | Gerber | H04W 24/08 370/254 |
| 2012/0207151 A1* | 8/2012 | Alt | H04L 29/06027 370/354 |
| 2012/0290694 A9* | 11/2012 | Marl | H04L 12/2807 709/223 |
| 2012/0307659 A1* | 12/2012 | Yamada | H04L 12/66 370/252 |
| 2013/0182664 A1* | 7/2013 | Chen | H04W 72/042 370/329 |
| 2013/0329746 A1* | 12/2013 | Palacios Valverde | H04L 12/2834 370/401 |
| 2014/0195666 A1* | 7/2014 | Dumitriu | H04L 12/4625 709/223 |
| 2014/0204947 A1* | 7/2014 | Krishnan | H04L 61/2514 370/392 |
| 2014/0307651 A1* | 10/2014 | Sarikaya | H04W 76/021 370/329 |
| 2014/0310390 A1* | 10/2014 | Sorenson, III | H04L 47/10 709/223 |
| 2014/0310391 A1* | 10/2014 | Sorenson, III | H04L 45/24 709/223 |
| 2014/0310417 A1* | 10/2014 | Sorenson, III | H04L 67/1002 709/226 |
| 2014/0310418 A1* | 10/2014 | Sorenson, III | H04L 67/1002 709/226 |
| 2015/0372973 A1* | 12/2015 | Lopez Da Silva | H04L 12/2818 370/254 |

OTHER PUBLICATIONS

Adam Kapovits, "P2055—Virtual CPE Virtual CPE Closed study", Sep. 1, 2011, pp. 1-2, XP007921900.
Daniel Abgrall, Orange, "Virtual Home Gateway", Eurescom study report, Sep. 2011, pp. 1-86, No. P2055, XP007921898.
Daniel Abgrall, Orange, P2055—Virtual Home Gateway, Eurescom, Sep. 2011, pp. 1-52, XP007921899.
Eui-Jik Kim et al., "Machine-to-machine platform architecture for horizontal service integration", EURASIP Journal on Wireless Communications and Networking, 2013, pp. 1-9, vol. 79.
International Search Report of PCT/EP2013/077347 dated Feb. 10, 2014 [PCT/ISA/210].
Written Opinion of PCT/EP2013/077347 dated Feb. 10, 2014 [PCT/ISA/237].

* cited by examiner

METHOD AND SYSTEM FOR THE CREATION, MODIFICATION AND REMOVAL OF A DISTRIBUTED VIRTUAL CUSTOMER HOME GATEWAY

CROSS REFERENCE TO RELATED APPLICATIONS

This application is a National Stage of International Application No. PCT/EP2013/077347, filed Dec. 19, 2013, claiming priority based on European Patent Application No. 12382518.4, filed Dec. 20, 2012, the contents of all of which are incorporated herein by reference in their entirety.

FIELD OF THE ART

The present invention relates in general to a method and system to network access in broadband deployment, and more particularly, to a method and a system for the creation, modification and removal of a distributed virtual customer home gateway.

PRIOR STATE OF THE ART

In broadband deployments, access to the network is provided by the deployment of a Home Gateway at the customer home. The Home Gateway features a varied set of functionality most of which is above Layer 3 (IP layer) in an OSI model. Part of this layer 3 functionality is applying NAT techniques so that only one public IP address is consumed per home, being this IP address shared by all the home end devices.

Other common names used for the Home Gateway are Customer Premises Equipment (CPE) or Internet Gateway Device (IGD).

There have been several initiatives to shift IP functionality away from the Home Gateway so that the equipment to deploy at the customer home is simplified and limited to layer 1 and 2 functionalities (bridging, WiFi access point and LAN-WAN adaptation).

One of these initiatives is the Eurescom project P2055 "Virtual CPE" [1] that analyzes the implication of such an approach. A functional distribution is proposed based on where the virtualization is accomplished. According to P2055 [2], Virtual Home Gateway capabilities can be shifted either to the BNG/BRAS or to the Access Node (typically a DSLAM or an OLT).

Virtual Home Gateways in Eurescom P2055 architecture are presented as individual instances (virtual HGW instance), one per home, that perform all the shifted IP functionalities (e.g. NAT). In order to scale and avoid that the Virtual Home Gateways deal with all IP packets and flows, it is suggested the evolution to an architecture where the control and the forwarding plane become separated and with different treatment for unknown flows (that would follow a slow path in the architecture) than already known ones (in the fast path). In this way, the Virtual Home Gateways will only deal with the new/unknown flows or those flows relevant to perform their functionalities.

Other of these initiatives is for instance Patent Application US 2010/0165993, which defines "A virtual network and method for providing an operator managed home LAN service". For that it enumerates the functionality that needs to be in an access interface deployed at the operator network. These functionalities include: NAT/FW, Web portal, AAA server, Mobile PoP, Service Server, Service Gateway, Mobile PoP, DHCP server (in the case of a bridged residential gateway), IP Edge router (in the case of routed residential gateway). However, the detailed interactions of the entities deployed at the operator network are not defined by the patent application.

On another hand, Patent Application WO 2012/089504 discloses a "Home Gateway System for Accessing Broadband Services" proposing an architecture where part of control and service functionality is moved to a new node called Software Execution Virtual Environment (SWEVE) where the rest of the Virtualized functionalities of the customer CPE remain at an IP Edge node (e.g. BRAS, BNG). In order for the architecture to work, the SWEVE must have Layer 2 connectivity with the customer home LAN. This architecture provides for an evolutionary approach making use of state of the art BRAS nodes, but scalability concerns remain because NAT with overlapping address spaces per homes must still be done on the BRAS node.

At the same time and because of the IPv4 address exhaustion, network operators are deploying Carrier Grade NAT solutions so that a pool of public IPv4 addresses can be shared among large sets of subscribers. These solutions assume that there is a CPE that is assigned a private IPv4 address unique inside the provider domain and that it make a first level of NAT in order for this unique private IP address to be shared by all the home end-devices. Then CGNAT is applied to this private IPv4 addresses so that they are translated to some public IP pool. Another approach is the use a technique called DS-Lite, where the CPE does not apply the first level of NAT but tunnels the home traffic in an IPv6 tunnel up to the CGNAT node, that applies NAT being aware of the private IPv4 addresses of the end devices.

The main problems with those Virtual CPE solutions are that place too much functionality on just one single box, thus introducing scalability problems. This is the case for the Eurescom architecture that proposes all functionality on a BRAS or access node. Even when the Virtual Home Gateway will only deal with the new/unknown flows or those flows relevant to perform their tasks, each Virtual Home Gateway will need dedicated hardware resources pre-reserved to deal with all its possible tasks simultaneously (e.g. Network Address and Port Translation, Firewall, DHCP server, etc.).

Placing too much functionality on a border node (BRAS, BNG) will make this to grow so that the number of nodes will have to be increased and the users will have to be re-provisioned across the new boxes (deployed to cope with the extra capacity required) along with the existing ones. This is an operational problem derived from the technical problem of achieving scalability for hundreds of thousands of homes.

In order to accomplish a scalable and smooth evolutionary solution, a distributed approach must be followed so that different kinds of functionalities reside in different network elements at the operator network. In that regard, the NAT functionality can be moved behind the BRAS node to a CGNAT solution and the control traffic (e.g. DHCP) can be relayed to some centralized control platform.

REFERENCES

[1] Eurescom project P2055 Virtual CPE. http://www.eurescom.eu/services/eurescom-study-programme/list-of-eurescom-studies/studies-launched-in-2010/p2055.html

[2] Eurescom D1-Virtual Home Gateway. September 2011. http://www.eurescom.eu/services/eurescom-study-programme/list-of-eurescom-studies/studies-launched-in-2010/p2055-virtual-cpe/d1-virtual-home-gateway.html

SUMMARY OF THE INVENTION

In accordance with this invention, the previous objective is obtained, in a first aspect, by providing a method for the creation, modification and removal of a distributed virtual CPE, wherein at least one distributed virtual CPE comprises at least one IP Edge node, at least one Carrier Grade NAT node, at least one User Configuration Server and at least one Line Configuration Server.

On contrary to the known proposals, the method of the first aspect involves the following steps:
  creating said at least one distributed virtual CPE, by said at least one IP Edge node, upon the reception of traffic from a home in the access line corresponding to said home;
  modifying said at least one distributed virtual CPE, by said at least one User Configuration Server, upon a customer request;
  removing said at least one distributed virtual CPE, either by said at least one IP Edge Node upon a traffic inactivity timeout detected in said access line or by said at least one Line Configuration Server upon an administrative command; and
  associating a line identifier and a customer identifier to said at least one distributed virtual CPE
Said association, termed vCPE context, is known partially or totally by the at least one IP Edge node, the at least one Carrier Grade NAT, the at least one User Configuration Server and the at least one Line Configuration Server, and is kept active during the whole life cycle of said distributed virtual CPE from the creation to the removal.

The vCPE context allows the communication of the at least one IP Edge node, the at least one Carrier Grade NAT, the at least one User Configuration Server and the at least one Line Configuration Server between them.

According to an embodiment, the line and customer identifiers are used by the at least one distributed virtual CPE to retrieve at least user configuration information from said at least one User Configuration Server.

According to another embodiment, the line and customer identifiers are further used by the distributed virtual CPE to establish a tunnel, based on the traffic demand from the access line and with configuration stored in the at least one Line Configuration Server, to forward the traffic from said at least one IP Edge node towards said at least one Carrier Grade NAT. Preferably, in yet another embodiment, said tunnel can be automatically established.

A sub tunnel can also be established in case a GRE technology is used; in this case, the established tunnel could be implemented as a GRE key inside a GRE tunnel, this GRE tunnel being shared among all the existent vCPE in a same IP Edge. In case a sub tunnel will be established, this establishing will also depend on a static pre configuration of said IP Edge node.

According to another embodiment, the at least user configuration information is provided upon creation of the vCPE context, and preferably involves information regarding an IP subnet and/or a NAT port mapping rules.

The line and customer identifiers can be also used by the at least one User Configuration Server to indicate that configuration changes need to be performed.

According to another embodiment, the modifying step includes receiving said customer request from one User Self-care Web Portal. The customer requests are sent by the user through the portal interface in order to modify the virtual CPE.

According to yet another embodiment, the removing step can include keeping the user configuration information if said removing has occurred because of the traffic inactivity timeout or can also return to the initial state before the creating step of the distributed virtual CPE. In both cases, the removing step will involve the communication between the network nodes: the at least one IP Edge node, the at least one Carrier Grade NAT, the at least one User Configuration Server and the at least one Line Configuration Server.

Finally, at least a Layer 2 visibility of the devices connected to the Access line at the customer premises will also be provided by the distributed virtual CPE.

The present invention in a second aspect provides a system for the creation, modification and removal of a distributed virtual CPE, wherein at least one distributed virtual CPE comprises at least an IP Edge node, at least a Carrier Grade NAT node, at least a User Configuration Server, and at least a Line Configuration Server.

In the system of the second aspect and on contrary to the known proposals:
  said at least one IP Edge node is adapted to create said distributed virtual CPE upon the reception of traffic from a home in the access line corresponding to said home and to remove it upon a traffic inactivity timeout detection in said access line;
  said at least one User Configuration Server is adapted to modify said distributed virtual CPE upon a customer request;
  said at least one Line Configuration Server is adapted to remove said distributed virtual CPE upon an administrative command.

In the system, said distributed virtual CPE is associated to a line identifier and a customer identifier, said association, termed vCPE context, being known partially or totally by the at least one IP Edge node, the at least one Carrier Grade NAT, the at least one User Configuration Server and the at least one Line Configuration Server, and being kept active during the whole life cycle of said distributed virtual CPE from the creation to the removal.

In the system, a User Self-care web portal further enables the reception of said customer request and the at least one IP Edge node, the at least one Carrier Grade NAT node, the at least one User Configuration Server, and the at least one Line Configuration Server are separated elements and are set in different locations of a broadband service provider network.

Finally, the at least one Line Configuration Server and the at least one User Configuration Server each has a database to store the vCPE context. The at least one Line Configuration Server to store the information associated to a customer identification and the at least one User Configuration Server to store user configuration information.

BRIEF DESCRIPTION OF THE DRAWINGS

The previous and other advantages and features will be more fully understood from the following detailed description of embodiments, with reference to the attached, which must be considered in an illustrative and non-limiting manner, in which:

FIG. 4 corresponds to the steps 1 to 6 of the process and FIG. 5 to the steps 7 to 11 respectively.

DETAILED DESCRIPTION OF SEVERAL EMBODIMENTS

Figure 1:
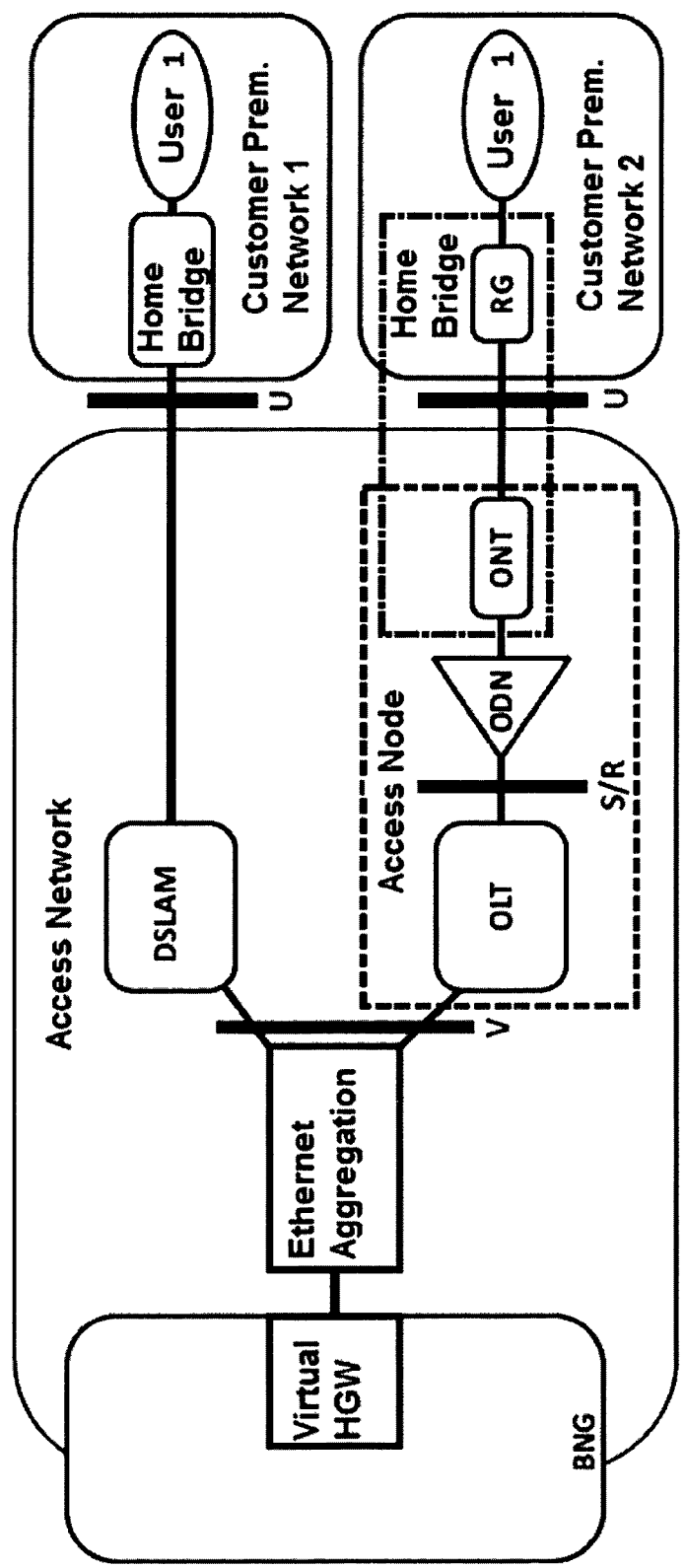
FIG. 1 is an illustration of the Virtual Home Gateway entities in the BNG used in the Eurescom P2055 project.
Figure 2:
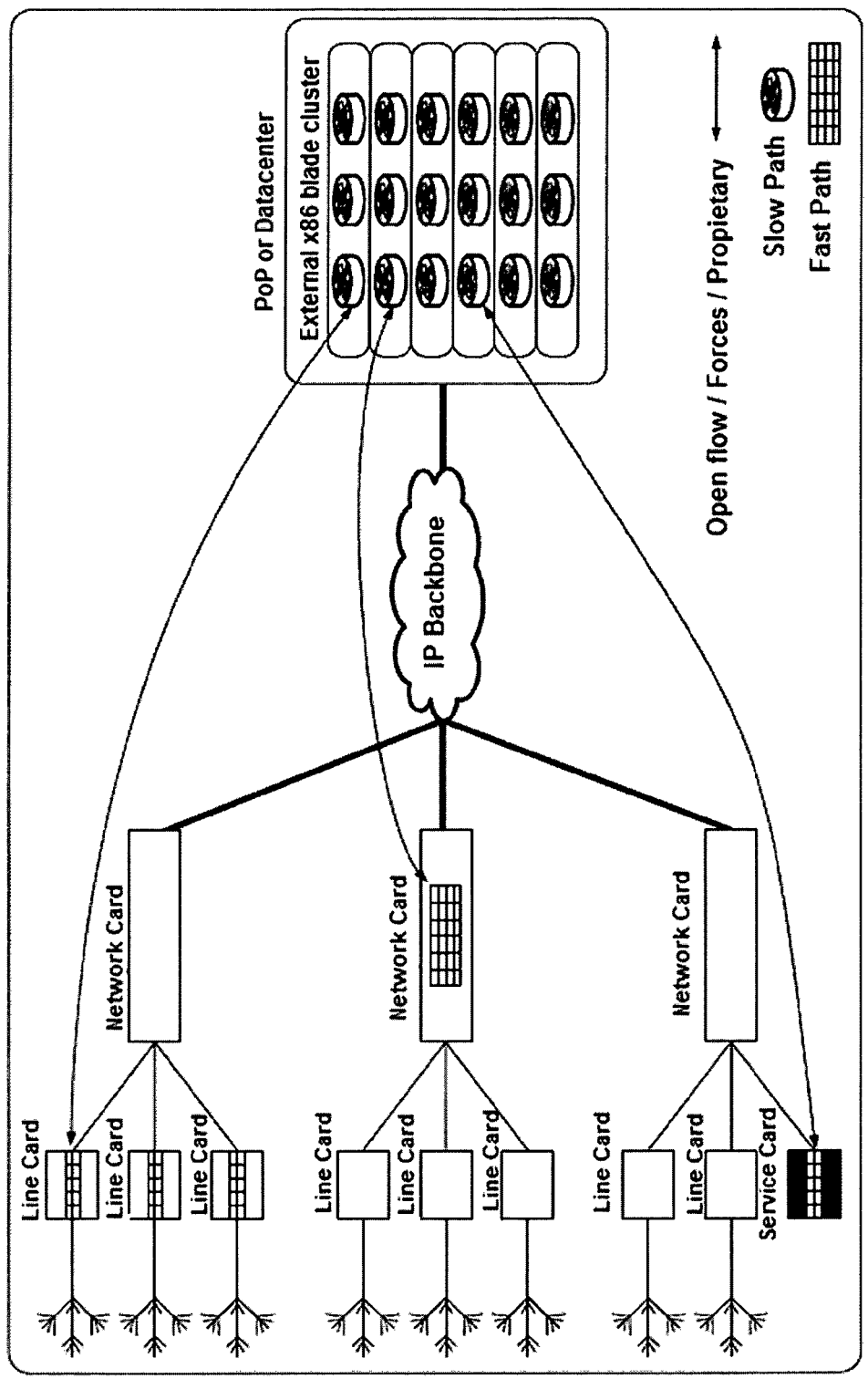
FIG. 2 is a representation of the scalability architecture of the Virtual Home Gateway through slow and fast path used in the Eurescom P2055 project.
Figure 3:
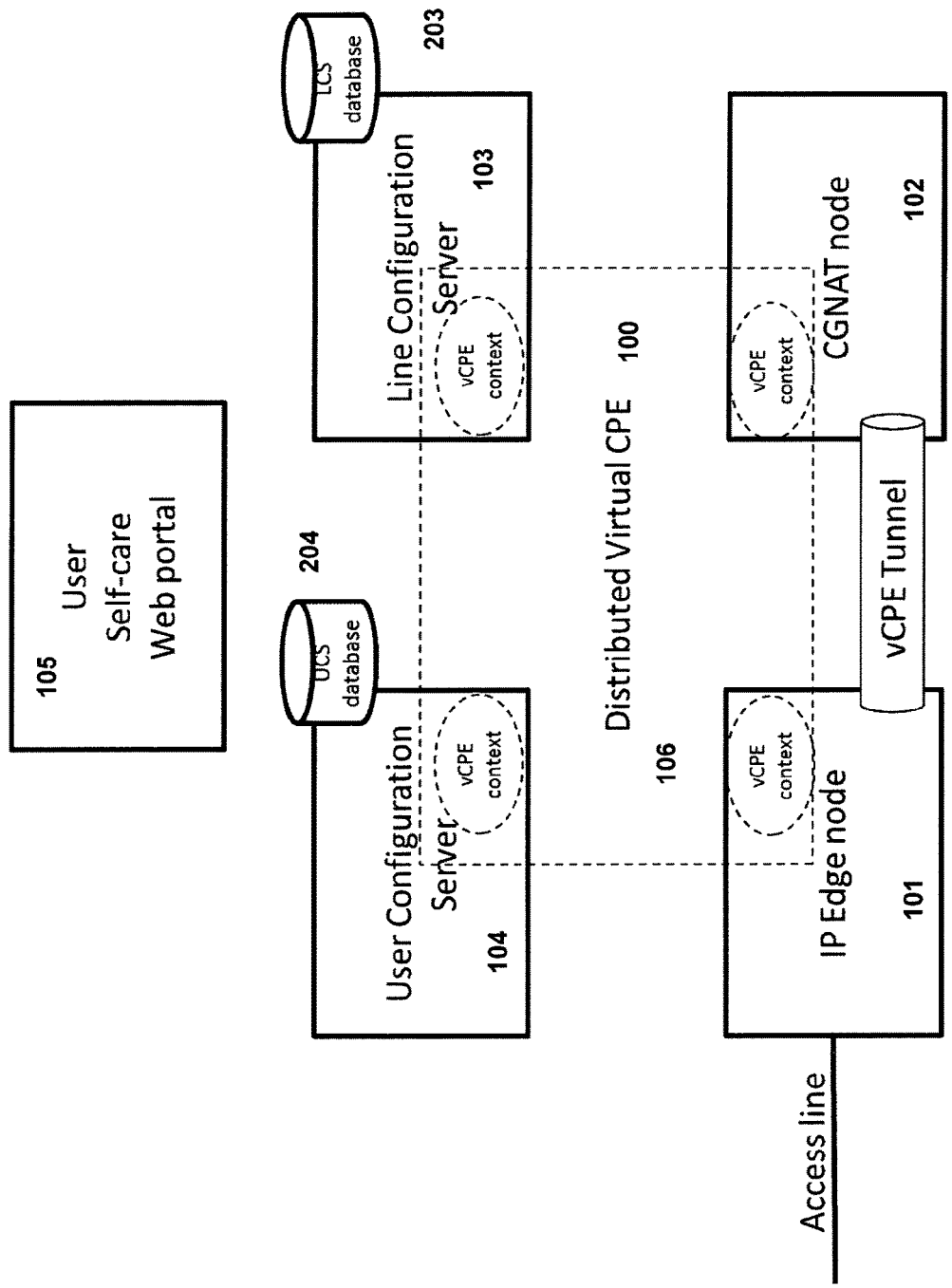
FIG. 3 is an illustration of the Distributed Virtual CPE proposed in the present invention, according to an embodiment.

Embodiments of the present invention describe a method and system to enable the dynamic management of a distributed Virtual CPE that comprises several operator network nodes. As shown in FIG. 3, these operator network nodes are:

IP Edge node: This network node will host a dynamic User Entity to be created as a result of the method of the present invention. This entity is sometimes referred to as VCPE entity' in state-of-the-art nodes. However, this entity does not implement all the functionality of the virtual CPE (vCPE) entity defined in this ID.

Carrier Grade NAT (CGNAT) node: will apply address translation from the home private IP address space to the public (and globally routable) IPv4 address space. Different homes are allowed to have overlapping private IP address spaces.

User Configuration Server (UCS): will host user generated configuration parameters that apply only to his or her home network configuration (IP subnet, NAT port mapping rules, etc.). The UCS will provide configuration parameters to the home end devices and to the IP Edge node when dynamically creating the User Entity.

Line Configuration Server (LCS): this network node is controlled by the network operator to setup the line and user associations and the network parameters to be applied.

User Self-care Web Portal: users can partially manage their configuration information stored in the User Configuration Server.

According to an embodiment of the present invention each distributed virtual CPE is associated to a line identifier and a customer identifier. Said association, which will be called vCPE context, is known partially or totally by the operator network nodes (IP Edge node, the Carrier Grade NAT, the User Configuration Server and the Line Configuration Server), Said association keeps active during the whole life cycle of said virtual CPE from the creation to the removal and allows the entities to communicate each other in order to perform the creation, modification and removal of the distributed virtual CPE.

The overall procedure can be subdivided in 3 individual procedures for the different goals intended when allowing the dynamic management of distributed Virtual CPE architecture. These 3 related procedures are: Dynamic creation of the distributed Virtual CPE, Dynamic removal of the distributed Virtual CPE and Dynamic modification of the distributed Virtual CPE.

Figure 4:
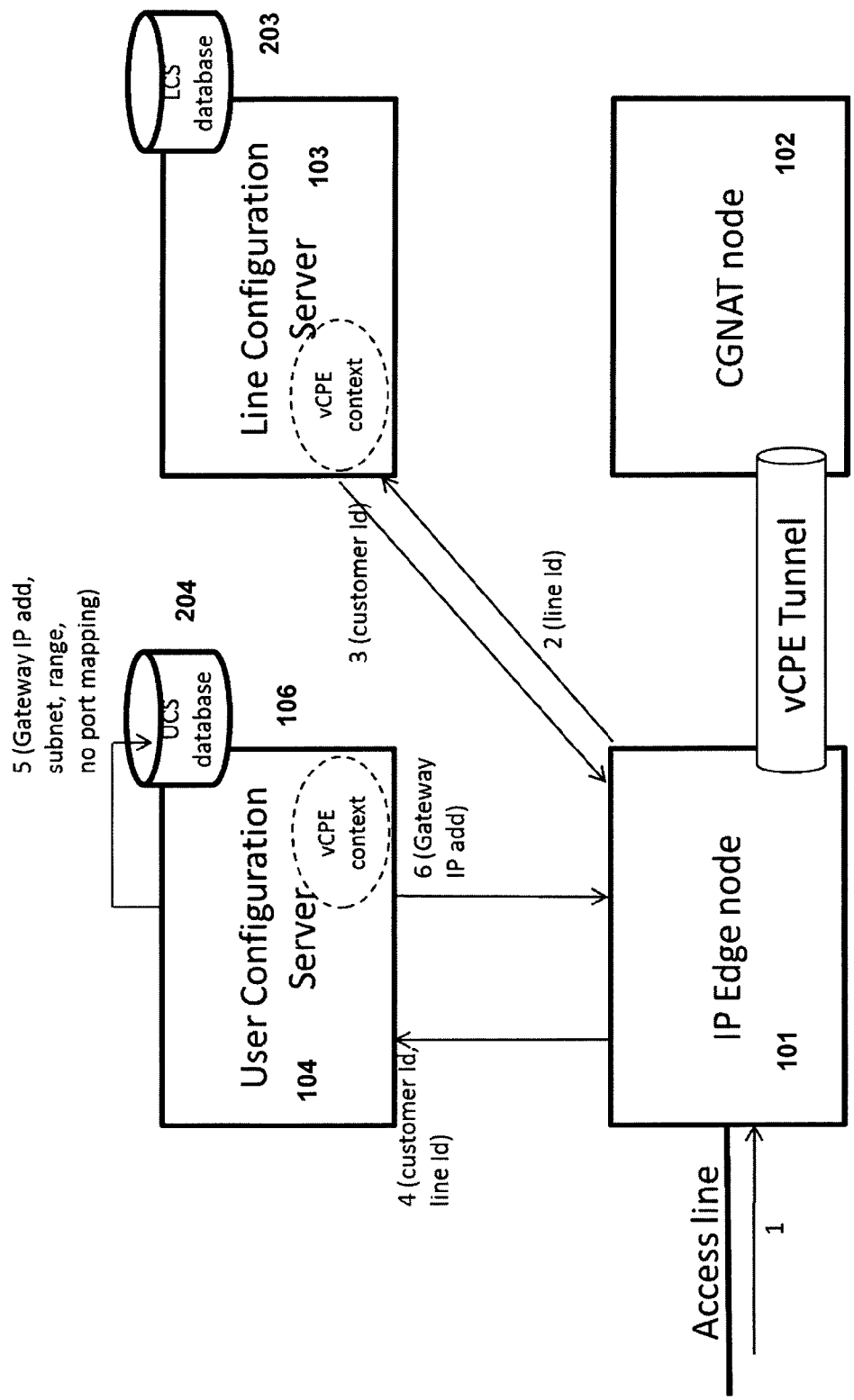
FIG. 4 and FIG. 5 are illustrations showing the creation process of the Virtual CPE, according to an embodiment of the present invention.

As shown in FIG. 4, the dynamic creation of the distributed Virtual CPE is triggered by the reception of traffic (1) from the home in the access line corresponding to that home in the IP Edge node. The IP Edge node sends a request to the Line Configuration Server (LCS) (2) including the line identifier (line_id) where traffic was received. The LCS provisions in its database an association (VCPE context) of the line identifier (line_id) to a customer identifier provisioned in the LCS for that line (customer_id).

The LCS sends back in its response (3) a customer identifier (provisioned in the LCS database for that line), and, optionally, the identifier for the CGNAT node that will be in charge of providing Internet access for that line. If the CGNAT node identifier is not provided by the LCS, it will have to be pre-provisioned at the IP Edge node.

The IP Edge node then sends a request (4) to the User Configuration Server (UCS) that includes both the line identifier and the customer identifier. If the UCS has no record for that customer-line association, it proceeds (5) to auto-provision a record (VCPE context) for that line_id with default values for the IP parameters that the user will be able to modify via the User Self-Care Web portal. Some examples of these modifiable IP parameters are: default Gateway IP address, home subnet, IP address range and/or no port mapping enabled.

Once the line is provisioned, the UCS sends a response (6) to the IP Edge node that includes the Gateway IP address that it must use to create an internal VCPE context in the IP Edge node to serve that access line. If the traffic that triggered the creation of the vCPE was a DHCP request from some device at the home, the answer may provide as well the IP configuration parameters for the device, to minimize signaling overhead.

Figure 5:
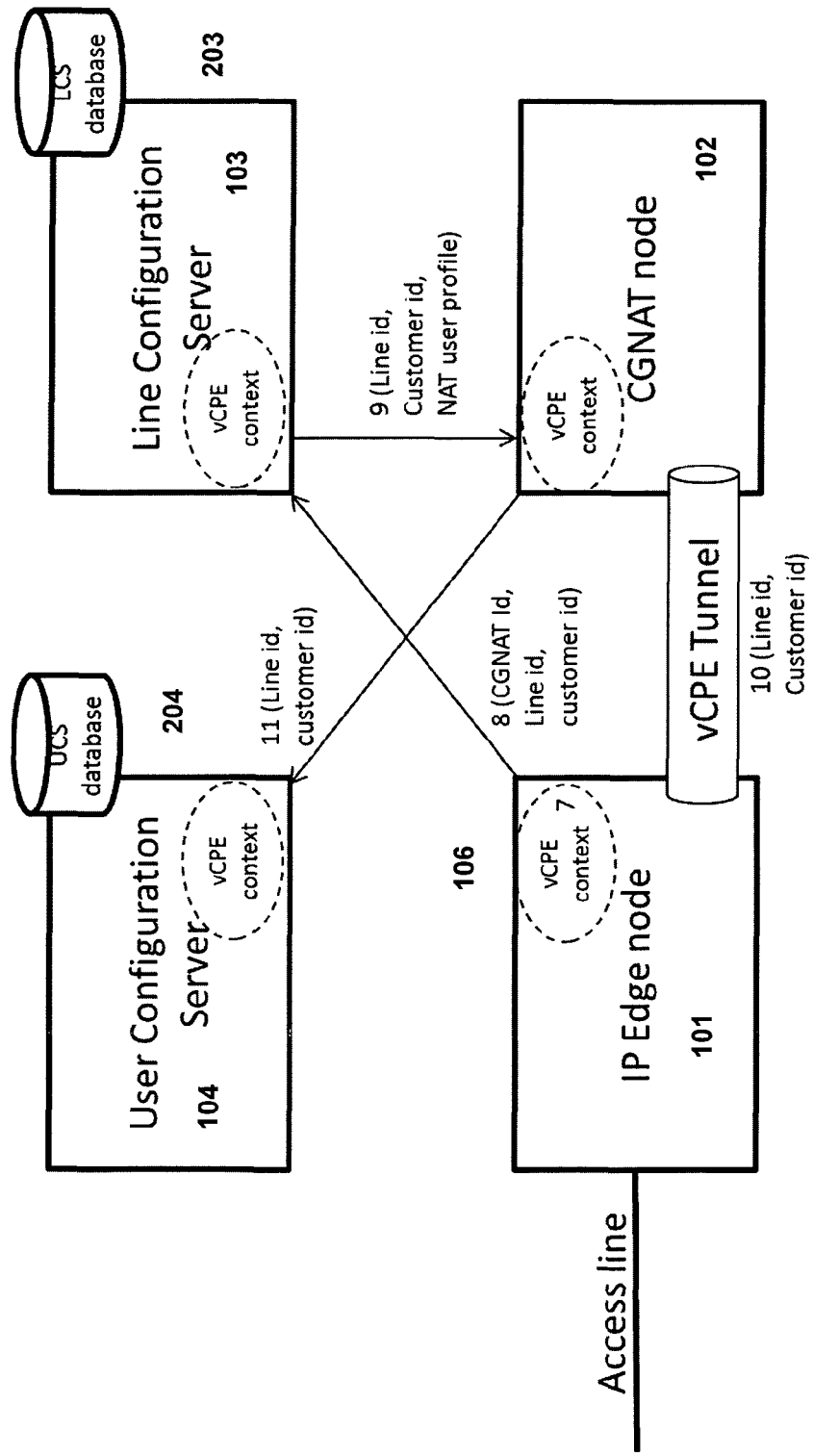

Once the vCPE context is created (7) as shown in FIG. 5, the IP Edge node starts to send (8) usage reporting messages for the vCPE towards the LCS. These messages include the CGNAT node id that was used when the vCPE was created (either received from LCS at the IP Edge node or preconfigured at the IP Edge node). The LCS forwards the messages (9) to the CGNAT node id and may include information about the NAT user profile (public port assignment scheme, maximum number of public ports, public IP address or pool, port range, NAT rule, etc.) specific to the NAT implementation capabilities.

When the vCPE entity at the IP Edge node has to forward traffic towards the Internet, it sends the packets received from the home towards the CGNAT node (10) that was assigned to that vCPE (either from the LCS or by static pre-configuration at the IP Edge node). Packets are encapsulated including a header that allows the CGNAT understand from which line and customer come the traffic. As an example, a tunnel to the CGNAT node can be created on-demand as a sub-tunnel of a tunnel connecting the IP Edge node and the CGNAT. It includes enough information in its headers to derive both the line id and the customer id that were used in the creation process of that vCPE. The tunnels connecting the IP Edge nodes and the CGNAT nodes are either created on-demand when the first sub-tunnel needs to be created or are pre-configured as part of the static pre-configuration of the IP Edge node.

When the CGNAT node receives traffic towards the Internet from a home, it derives the line_id and the customer_id from the packet headers and it sends a request to the UCS (11) so that applicable Port Mapping information is retrieved.

From that moment on, all the entities and their corresponding vCPE contexts are established at all the different elements of the distributed architecture for the Virtual CPE (IP Edge node, CGNAT node, UCS, LCS).

On another hand, the virtual CPE and its associated state can be also been dynamically removed from different elements in the Virtual CPE distributed architecture. According to an embodiment, the dynamically removal can be done because of two possible reasons: because of an inactivity timeout and because of an administrative command.

In the case that the removal is performed because of inactivity timeout, the state or vCPE context associated to the Distributed Virtual CPE at the different elements must be removed, but the provisioning information generated by the user must be kept. On the other hand, when the removal is performed because of an administrative command, FIG. 6, all the information regarding the Distributed Virtual CPE must be removed taking the system to the initial situation (before the dynamic creation of the Virtual CPE).

When the removal is done because of an inactivity timeout the User Configuration Server (UCS) state is maintained independently of the IP Edge and CGNAT state. The inactivity timer for granted parameters in the UCS can be much higher than the inactivity timer for the state information generated in IP Edge node and CGNAT node, and the UCS and its information can survive the failure of IP Edge and CGNAT nodes, without interrupting the flow of traffic between end devices at the home.

The IP Edge node keeps state as long as there is traffic from or towards the home devices. After an inactivity timeout (statically provisioned or received from LCS), the vCPE context is removed from the IP Edge node. The IP Edge node sends a notification message to the LCS to remove vCPE context. The LCS in turn sends a message to the CGNAT so that it can free the resources for that combination of line id and customer id.

Figure 6:
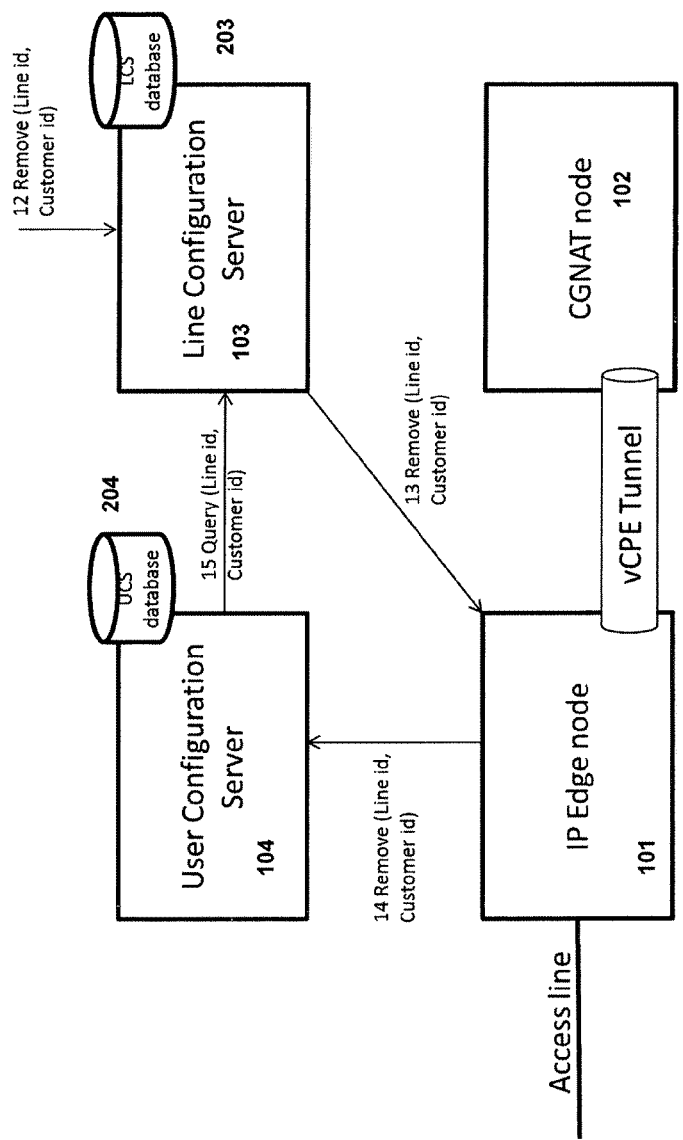
FIG. 6 is an illustration of the administrative removal process of the virtual CPE, according to an embodiment of the present invention.

In the CGNAT node, Virtual CPE context is removed when:
  All the NAT associations for a combination of line id and customer id expire. The CGNAT sends a message to the LCS to signal the removal of vCPE context.
  The LCS signals to the CGNAT that the vCPE context has been removed in the IP Edge node On contrary, as it is shown in FIG. 6, the administrative removal of the Virtual CPE is executed when the network operator no longer means to provide broadband access service to the line and/or customer. The process is triggered by a removal command for the vCPE context in the LCS (12). The LCS sends a notification message to the IP Edge Node (13) and optionally to the CGNAT so that vCPE context is removed from them. The notification of the CGNAT is optional because vCPE context would eventually time out by inactivity once the vCPE context is removed from the IP Edge node and traffic stops flowing.

The LCS may signal the removal of the vCPE context to the UCS (14) as well, so that the auto-provisioned information and the information created in the UCS by the user via a Web portal is removed from the UCS database. Another option is not to remove the information in the UCS for this combination of line id and customer id in a synchronized way with the administrative vCPE removal. In that case, the information would remain in the UCS database but it would never be used since the association line_id-customer_id would have been removed from the LCS and so the LCS would never trigger the creation of a Virtual CPE with that combination of line and customer id. The UCS in that case could perform a periodic purge of line_id, customer_id associations that have been inactive for an extended period. For that purpose, the UCS would send a request to the LCS (15) to check the existence of the line_id customer_id association, and if it is no longer in the LCS proceed to remove all the information related from the UCS database.

In case the sub-tunnel between the User Entity in the IP Edge Node and the CGNAT involves external configuration in either element, the vCPE removal process will also imply that this information will be removed from the IP Edge and/or CGNAT node.

Figure 7:
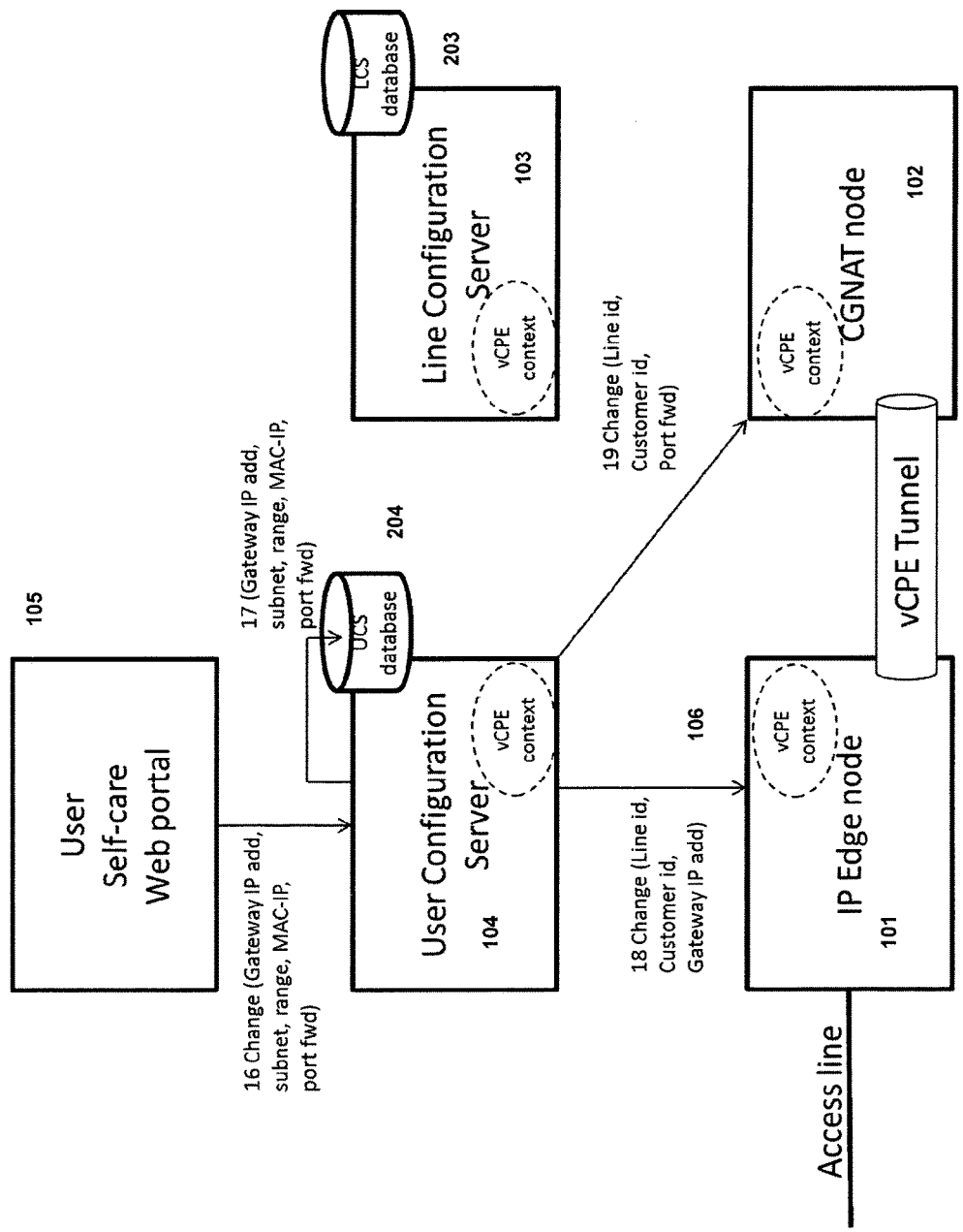
FIG. 7 is an illustration of the modification process of the virtual CPE, according to an embodiment of the present invention.

As shown in FIG. 7, the only dynamic modification of the distributed Virtual CPE that is subject to the procedure of the invention is the change of the parameters that the user does in the UCS database from a self-care Web portal (16). The parameters that the user can change are:
  IP address subnet and range: this information only affects the IP address assignments that the UCS will provide to the end devices (17). The UCS can only assign IP address from that configured IP address range within the subnet.
  MAC-IP associations: this information only affects the IP address assignment that the UCS will provide to the end devices (17). The UCS will provide the IP address specified to the device with the MAC address in the association.
  Subnet/Gateway IP address: a notification must be sent (18) to the IP Edge node to provide it with the new Gateway IP address and subsequently use that Gateway IP address in new notifications of vCPE creation from the IP Edge node.
  Port Forwarding rules: once it is changed in the UCS, the UCS sends a notification message to the CGNAT (19) so that the change in the port forwarding rules for a combination of line id and customer id is updated in the CGNAT.

Several examples embodiments of the present invention can be also implemented using different implementations for the networks nodes.

One of these examples embodiments is a UCS that is implemented as a DHCP server that provides IP configuration parameters to the home end devices and vCPE configuration parameters (Gateway IP address) to the IP Edge node. The IP Edge node acts as a DHCP relay to the DHCP based UCS for the home end devices DHCP requests.

In this case, the traffic from the home LAN that triggers the creation of the Virtual CPE could be DHCP traffic from the home end devices. In that case the request from the IP Edge node to the DHCP server to request information regarding the vCPE context to be created can be piggybacked on the first DHCP request that is relayed from the IP Edge node to the DHCP server.

Another embodiment of this invention is a Line Configuration Server that uses RADIUS (or DIAMETER) protocol for the exchanges it has with the IP Edge node and the CGNAT node, and optionally with the UCS. This RADIUS protocol support includes Change of Authorization (CoA) messages to allow for the dynamic modification of the vCPE context based on the different asynchronous events described in the procedure of this invention.

Another embodiment of this invention is the use of a BRAS (as defined in Broadband Forum TR-092) or BNG (as defined in Broadband Forum TR-101) node as the IP Edge node described in the procedure of this invention.

Another embodiment of this invention is the use of a Virtual Routing and Forwarding entity as the vCPE context that is created dynamically in the IP Edge node as a result of the messages exchanged with the LCS in the creation process of this invention. That VRF enables the use of overlapping IP addresses in different access lines.

Another embodiment of this invention is the use of policy routing rules in the IP Edge node that are communicated dynamically to the IP Edge node as a result of the messages exchanged with the LCS in the creation process of this invention. This policy routing rules enable the routing of traffic from the IP Edge node access line to the tunnel to the CGNAT that corresponds to a specific combination of line id and customer id. That policy routing enables the use of overlapping IP addresses in different access lines.

Another embodiment of this invention is the use of GRE (Generic Routing Encapsulation) protocol as the stateless tunnel technology used to transmit packets from the IP Edge node to the CGNAT node. Either the key field of the GRE header or the IP addresses of the tunnel (or both) can be used to convey information about the line id and customer id.

Another embodiment of this invention is the use of DS-Lite (Dual Stack Lite) protocol as the stateless tunnel technology used to transmit packets from the IP Edge node to the CGNAT node. The line id and customer id can be coded as part of the IPv6 interface ID of the IPv6 addresses used as source or destination for the DS-Lite tunnel.

Another embodiment of this invention is the use of Port Control Protocol as the port control technology to enable the configuration of the port forwarding rules at the CGNAT node.

This invention allows for a dynamic and distributed Virtual CPE implementation spread across several operator network entities. Its distributed nature allows for separate scalability requirements of each of these elements.

The complexity of a distributed approach is handled by the invention so that the interaction of the systems and the network elements are minimized.

As a result, the benefits of the Virtual CPE paradigm can be achieved in a scalable and manageable way. The Virtual CPE benefits include:

- Simplified physical CPE: thus resulting in an enhanced OPEX and in a reduced CAPEX.
- Enhanced remote diagnosis capabilities because of Layer 2 visibility.
- Enhanced service delivery because of Layer 2 visibility and possibility to use Consumer Electronic protocols such as DLNA.
- Future protection against Layer 3 capabilities evolution (no longer in the physical CPE).

The foregoing describes embodiments of the present invention and modifications, obvious to those skilled in the art can be made thereto, without departing from the scope of the present invention.

ACRONYMS

BNG Border Network Gateway
BRAS Broadband Remote Access Server
CGNAT Carrier Grade NAT
CPE Customer Premises Equipment
DHCP Dynamic Host Configuration Protocol
DSLAM Digital Subscriber Line Access Multiplexer
LCS Line Configuration Server
NAT Network Address Translation
OLT Optical Line Termination
RADIUS Remote Authentication Dial-In User Server
UCS User Configuration Server

The invention claimed is:

1. A method for the creation, modification and removal of a distributed virtual customer home gateway, wherein at least one distributed virtual customer home gateway comprises:

an association between an access line identifier and a customer identifier, wherein said association is stored in at least one Line Configuration Server; and
state and configuration information relative to said association, wherein said state and configuration information is stored:
partly, in at least one IP Edge node, acting in a provider edge, that provides tunneling forwarding of customer end devices traffic destined to public IPv4 internet to at least one Carrier Grade network address translation (NAT) node,
partly in the at least one Carrier Grade NAT node that provides NAT translation to public source IPv4 addresses to customer traffic, and
partly in at least one User Configuration Server that provides:
IP configuration parameters selected by a customer corresponding to the customer identifier of the at least one IP Edge node, enabling it to act as an IP gateway address for customer end devices corresponding to the customer, connected to an access line corresponding to the access line identifier through a bridging device,
NAT configuration parameters to the at least one Carrier Grade NAT node, enabling it to conduct said NAT translation according to customer preferences, and
IP configuration parameters dynamically to the customer end devices,
the method comprises the following steps:
creating said state information of the at least one distributed virtual home gateway, by the at least one IP Edge node, upon a reception of traffic from a home in the access line corresponding to said access line identifier and after the at least one IP Edge node having obtained the customer identifier associated to said access line identifier from the at least one Line Configuration Server and after the at least one IP Edge node having provided relaying of control traffic from customer end devices tagged with the access line identifier and said customer identifier to said at least one User Configuration Server, said at least one User Configuration Server providing the IP, NAT and IP configuration parameters based on the access line identifier and the customer identifier introduced in the control traffic from the customer end devices by the at least one IP Edge node;
establishing a tunnel from said at least one IP Edge node to said at least one Carrier Grade NAT node making use of said access line identifier and said customer identifier as part of an encapsulation header to forward the customer end devices traffic destined to the public IPv4 internet from said at least one IP Edge node towards said at least one Carrier Grade NAT node, said at least one Carrier Grade NAT node providing the NAT translation to public source IPV4 addresses to customer traffic based on said encapsulation header;
modifying said configuration information of the at least one distributed virtual customer home gateway, by said at least one User Configuration Server, upon a customer request; and
removing said state information of the at least one distributed virtual customer home gateway, either by said at least one IP Edge Node upon a traffic inactivity timeout detected in said access line or by said at least one Line Configuration Server upon an administrative command,
wherein said association stored in the at least one Line Configuration Server is termed virtual customer home gateway context, and is known partially or totally by the at least one IP Edge node, the at least one Carrier Grade NAT, the at least one User Configuration Server and the at least one Line Configuration Server, and is kept active during a whole life cycle of said distributed virtual customer home gateway from the creation to the removal.

2. The method according to claim 1, wherein the access line identifier and the customer identifier of said association allow the communication of the at least one IP Edge node, the at least one Carrier Grade NAT, the at least one User Configuration Server and the at least one Line Configuration Server between them regarding the virtual customer home gateway context.

3. The method according to claim 1, comprising using said access line and customer identifiers by the at least one IP Edge node and the at least one Carrier Grade NAT node to retrieve at least user configuration information from said at least one User Configuration Server.

4. The method according to claim 3, comprising providing said at least user configuration information to the at least one distributed virtual home gateway from said at least one User Configuration Server upon creation of the state information on the Carrier Grade NAT node and upon creation of the state information on the IP Edge node.

5. The method according to claim 4, wherein said at least user configuration information provided from the at least one User Configuration Server comprises at least information regarding at least an IP subnet and/or a NAT port mapping rules.

6. The method according to claim 1, comprising automatically establishing said tunnel.

7. The A-method according to claim 1, comprising using said access line identifier and the customer identifier by the at least one User Configuration Server to indicate to the at least one IP Edge node and to the at least one Carrier Grade NAT node that configuration changes need to be performed for the at least one distributed virtual customer home gateway.

8. The A-method according to claim 1, wherein the modifying step includes receiving said customer request from at least one User Self-care Web Portal.

9. The method according to claim 1, wherein the removing step includes keeping the configuration information of the at least one distributed virtual customer home gateway stored in the at least one User Configuration Server if said removing has occurred because of the traffic inactivity timeout.

10. The method according to claim 9, wherein the removing step involves communication between the at least one IP Edge node, the at least one Carrier Grade NAT node, the at least one User Configuration Server, and the at least one Line Configuration Server.

11. The A-method according to claim 1, wherein the removing step includes returning to an initial state before the creating step of the at least one distributed virtual customer home gateway.

12. The method according to claim 1, wherein said at least one distributed virtual customer home gateway comprises at least a Layer 2 visibility of the customer end devices connected to the access line at a customer premises corresponding to the customer.

13. A distributed virtual customer home gateway, comprising:
an association between an access line identifier and a customer identifier, wherein said association is stored in at least one Line Configuration Server; and state and configuration information relative to said association, wherein said state and configuration information is stored:
partly, in at least one IP Edge node, acting in a provider edge, that provides tunneling forwarding of customer end devices traffic destined to public IPv4 internet to at least one Carrier Grade network address translation (NAT) node,
partly in the at least one Carrier Grade NAT node that provides NAT translation to public source IPv4 addresses to customer traffic, and
partly in at least one User Configuration Server that provides:
IP configuration parameters selected by a customer corresponding to the customer identifier of the at least one IP Edge node, enabling it to act as an IP gateway address for customer end devices corresponding to the customer connected to an access line corresponding to the access line identifier through a bridging device,
NAT configuration parameters to the at least one Carrier Grade NAT node, enabling it to conduct said NAT translation according to customer preferences, and
IP configuration parameters dynamically to the customer end devices,
comprising:
said at least one IP Edge node is a configured to:
create said state information of the at least one distributed virtual customer home gateway upon the reception of traffic from a home in the access line corresponding to said access line identifier, after having obtained the customer identifier associated to the access line identifier from the at least one Line Configuration Server and after having provided relaying of control traffic from customer end devices tagged with the access line identifier and said customer identifier to said at least one User Configuration Server,
establish a tunnel to said at least one Carrier Grade NAT node making use of the access line identifier and the customer identifier as part of an encapsulation header to forward the customer end devices traffic destined to the public IPv4 internet from said at least one IP Edge node towards said at least one Carrier Grade NAT node,
and
remove the state information of the at least one distributed virtual customer home gateway upon a traffic inactivity timeout detection in the access line;
said at least one Carrier Grade NAT node provides the NAT translation to public source IPV4 addresses to customer traffic based on said encapsulation header;
said at least one User Configuration Server provides the IP, NAT and IP configuration parameters based on the access line identifier and the customer identifier introduced in the control traffic from the customer end devices by the at least one IP Edge node and is configured to modify said configuration information of the at least one distributed virtual customer home gateway upon a customer request; and
said at least one Line Configuration Server is configured to remove the state information of the at least one distributed virtual customer home gateway upon an administrative command,
wherein said association stored in the at least one Line Configuration Server, is termed virtual customer home gateway context, being known partially or totally by the at least one IP Edge node, the at least one Carrier Grade NAT, the at least one User Configuration Server and the at least one Line Configuration Server, and being kept active during a whole life cycle of said distributed virtual customer home gateway from the creation to the removal.

14. The distributed virtual customer home gateway according to claim 13, further comprising at least one User Self-care web portal for enabling the reception of said customer request.

15. The distributed virtual customer home gateway according to claim 13, wherein the at least one IP Edge node, the at least one Carrier Grade NAT node, the at least one User Configuration Server, and the at least one Line Configuration Server are separated elements and are set in different locations of a broadband service provider network.

16. The distributed virtual customer home gateway according to claim 13, wherein the at least one Line Configuration Server and the at least one User Configuration Server each comprises a database to store the virtual customer home gateway context associated to a customer access line identification and customer configuration information respectively.

* * * * *